United States Patent
Terashima et al.

(10) Patent No.: US 8,590,664 B2
(45) Date of Patent: Nov. 26, 2013

(54) STEERABLE DRIVE MECHANISM AND OMNIDIRECTIONAL MOVING VEHICLE

(75) Inventors: Kazuhiko Terashima, Toyohashi (JP); Takashi Ono, Toyohashi (JP); Yuuki Ueno, Toyohashi (JP)

(73) Assignee: National University Corporation Toyohashi University of Technology, Toyohashi-shi (JP)

( * ) Notice: Subject to any disclaimer, the term of this patent is extended or adjusted under 35 U.S.C. 154(b) by 141 days.

(21) Appl. No.: 13/378,394

(22) PCT Filed: Jun. 15, 2010

(86) PCT No.: PCT/JP2010/060078
§ 371 (c)(1),
(2), (4) Date: Jan. 23, 2012

(87) PCT Pub. No.: WO2010/147100
PCT Pub. Date: Dec. 23, 2010

(65) Prior Publication Data
US 2012/0111648 A1    May 10, 2012

(30) Foreign Application Priority Data

Jun. 19, 2009    (JP) .................................. 2009-146050

(51) Int. Cl.
*B62D 9/00* (2006.01)
*B60K 7/00* (2006.01)

(52) U.S. Cl.
USPC ........................................... 180/411; 180/6.5

(58) Field of Classification Search
USPC ............ 301/6.5; 180/6.5, 6.48, 252, 253, 411
See application file for complete search history.

(56) References Cited

U.S. PATENT DOCUMENTS 4,461,367 A * 7/1984 Eichinger et al. ............. 180/252
4,778,024 A * 10/1988 Matsumoto et al. .......... 180/167

(Continued)

FOREIGN PATENT DOCUMENTS

JP    62 128833    6/1987
JP    1 282029    11/1989

(Continued)

OTHER PUBLICATIONS

Wada, M., "Design and Analysis of a Wheeled Platform with a Synchro Caster-drive Mechanism for Holonomic and Omnidirectional Mobile Robots," Journal of the Robotics Society of Japan, vol. 19, No. 6, pp. 784-793, (Sep. 15, 2001) (with English abstract).

(Continued)

*Primary Examiner* — Tony Winner
(74) *Attorney, Agent, or Firm* — Oblon Spivak, McClelland, Maier & Neustadt, L.L.P.

(57) ABSTRACT

A drive mechanism includes a rotatable steering unit, a wheel supported by the steering unit, a drive member rotating about an axis extending along a center axis of the steering unit, an output shaft located at an offset position from the center axis of the steering unit and transmitting rotational force of the drive member to the wheel. The drive member includes a first drive unit driven in a forward rotation direction and a second drive unit driven in a reverse rotation direction and located coaxially with the first drive unit. The output shaft includes a first output unit to which driving force is transmitted from the first drive unit, and a second output unit to which driving force is transmitted from a conversion unit for converting rotation of the second drive unit, is restricted by both the output units, and transmits rotational force obtained from the output units to the wheel.

13 Claims, 11 Drawing Sheets

(56) References Cited

U.S. PATENT DOCUMENTS

| | | | | |
|---|---|---|---|---|
| 5,128,598 | A | * | 7/1992 | Avitan ............................ 318/587 |
| 5,862,874 | A | * | 1/1999 | Brienza et al. ................... 180/6.5 |
| 6,491,127 | B1 | * | 12/2002 | Holmberg et al. ............. 180/252 |
| 6,988,570 | B2 | * | 1/2006 | Takeuchi ...................... 180/6.48 |
| 8,424,627 | B2 | * | 4/2013 | Kuo et al. ...................... 180/253 |
| 2001/0008985 | A1 | | 7/2001 | Wada | 
| 2005/0236208 | A1 | * | 10/2005 | Runkles et al. ............... 180/254 |
| 2007/0256868 | A1 | * | 11/2007 | Romig ........................... 180/6.5 |
| 2011/0024219 | A1 | * | 2/2011 | Jorgensen et al. ............. 180/252 |

FOREIGN PATENT DOCUMENTS

| | | |
|---|---|---|
| JP | 8 300960 | 11/1996 |
| JP | 2000 127776 | 5/2000 |
| JP | 2001 199356 | 7/2001 |
| JP | 2003 127605 | 5/2003 |
| JP | 2004 231043 | 8/2004 |
| JP | 2005 67334 | 3/2005 |
| JP | 2006 1518 | 1/2006 |
| JP | 2008 213570 | 9/2008 |
| JP | 2008 279848 | 11/2008 |

OTHER PUBLICATIONS

Kitagawa, H., et al., "Development of Differential-Drive Steering System for Omnidirectional Mobile Robot," Journal of the Robotics Society of Japan, vol. 27, No. 3, pp. 343-349, (Apr. 15, 2009) (with English abstract).

International Search Report Issued Aug. 10, 2010 in PCT/JP10/60078 Filed Jun. 15, 2010.

Office Action issued Mar. 1, 2013 in Chinese Application No. 201080027192.5.

* cited by examiner (a)

(b)

(c)

(a)

(b)

(a)

(b)

(a)

(b)

(a)

(b)

STEERABLE DRIVE MECHANISM AND OMNIDIRECTIONAL MOVING VEHICLE

TECHNICAL FIELD

The present invention relates to a vehicle for moving an electric-powered wheelchair, an automatic transporting machine or the like in all directions and a steerable drive mechanism for the same.

BACKGROUND ART

With the arrival of an aging society, the number of care receivers is increasing in Japan. Elderly people with impaired motor function, especially those with disabilities in their lower body, need to travel by wheelchair. In addition, people disabled by birth or accident who have walking difficulty due to motor dysfunction also use wheelchairs as a necessity for life. Although some users operate wheelchairs by themselves, most of the users with severely impaired motor function have their wheelchairs operated by helpers and electric-powered wheelchairs have been developed in order to lighten the burden of helpers who take care of the abovementioned elderly or handicapped people. However, attention has been called to the problem that common electric-powered wheelchairs require a large space for turning and therefore it is difficult to use those wheelchairs in places which cannot offer sufficient space (e.g., ordinary houses and apartments).

On the other hand, in production facilities such as processing plants, a large amount of clear floor space is not available in order to secure space for installing machine tools, space for storing raw materials and so on. As is often the case, the floor space is sufficient for workers to walk around but not for transportation vehicles to move around with enough clearance. Therefore, in production facilities, a lot of transporting equipment such as conveyors is used, but members which are not suitable to be transported by conveyors (e.g., small component parts and machining swarf) are transported by transportation vehicles capable of moving around on the floor, so vehicles suitable for transportation in a small space have been desired.

Under these circumstances, vehicles capable of moving in all directions have been developed in order to make a change of direction even in a small space. Structures of such vehicles are roughly classified into two types: those which use wheels of particular kinds of structures and those which steer wheels. Examples of the former type of vehicle structure include one in which a plurality of rotors are attached to an outer peripheral ring constituting a wheel body (a portion corresponding to a rim) in a manner to be rotatable around the outer peripheral ring as an axis (see PTL 1) and one in which barrel-shaped split rollers are mounted on roller shafts which are provided in outer tangential directions of a wheel (see PTL 2).

The technique of the abovementioned structures employs, in addition to a wheel which plays a primary role, auxiliary wheels (rotors or barrel-shaped rollers) which are rotatable in perpendicular directions to an outer periphery of the wheel. Accordingly, the vehicle can move not only in back and forth directions but also in left and right directions. However, when the vehicle moves in diagonal directions, the auxiliary wheels do not rotate in the diagonal directions, but provide frictional resistance against the ground. This technique also involves a problem that the entire equipment is complicated in order to make a motor drive a wheel of such a complicated structure.

On the other hand, examples of the latter type of vehicle structure include one in which the direction of a wheel is changed by an output gear of a gyration shaft-driving motor, which engages with a gear provided on a gyration shaft in a roughly flat plate form (see PTL 3) and one in which a wheel support part for supporting a wheel is turned by a motor for gyration (see PTL 4).

PTL 3 is constructed such that only in a gyration mode, the output gear of the gyration shaft-driving motor comes in engagement with the gear of the gyration shaft and in an ordinary running mode the engagement is released and the driving force of the gyration shaft-driving motor is utilized for driving the wheel. According to this structure, however, the engagement and disengagement of the gear of the gyration shaft and the gear on the driving side are repeated and in the case of engagement, both the gears contact each other. As a result, in order to prevent loss of gear teeth, change of motor speed has been required (See paragraph 0010 of PTL 3). On the other hand, PTL 4 does not disclose switching between a gyration mode and a non-gyration mode in detail, but if the switching is executed by on and off of a motor, the frequency of using the gyration motor is low and operation rate of the motor cannot help being low.

In view of the above, the present inventors developed a mechanism for driving and steering a wheel by combining and redistributing outputs of two power sources by using a plurality of gear mechanisms (see PTL 5). This technique is a differential drive steering mechanism using a planetary gear mechanism, in which rotation of planetary gears sandwiched by a sun gear and a ring gear enables driving force to travel to be output to a wheel and at the same time movement of the abovementioned planetary gears around the sun gear enables the wheel to be steered.

This mechanism thus realizes axial rotation and orbital revolution of the planetary gears by simultaneously rotating the sun gear and the ring gear by two kinds of motors and controlling the number of rotations of these motors, so this is suitable as an omnidirectional moving mechanism. However, since the sun gear and the ring gear are widely different from each other in the number of teeth, the state of orbital revolution in differential drive may lack stability. In other words, in differential drive, it is possible to control the number of rotations of the ring gear having a greater number of teeth, and increase or decrease the number of rotations of the ring gear based on that of the sun gear. However, when both the gears rotate at high speed, the wheel has to be steered by decreasing the number of rotations of either one of the gears. When the number of rotations of the ring gear is to be decreased, delicate control of the number of rotations is possible in accordance with the number of teeth, but when the number of rotations of the sun gear is to be decreased, there is a possibility that a light change causes a wide change in differential state. There is also a possibility that the motors respectively driving the sun gear and the ring gear at different numbers of rotations are not stable in durability.

Another technique is constructed such that a pair of differential casters are formed by two parallel-arranged wheels and the direction of the casters is changed by the number of rotation of both the wheels (see PTL 6). In this technique, a pair of motors as power sources is respectively mounted in the casters, and when the motors rotate at the same number of rotations, the casters go straight and when the two motors rotate at different numbers of rotations, the casters make a change of direction. However, since these casters are constituted by two parallel-arranged wheels, a difference in frictional resistance acting on the two wheels and a difference in condition of a surface on which these casters move (a floor surface, a road surface, etc.) may affect whether desired impellent force can be obtained or not in accordance with the controlled number of rotations, so there is a need to be constituted by a single wheel.

CITATION LIST

Patent Literature

[PTL 1] Japanese Unexamined Patent Publication No. 2003-127605 (0013, FIG. 1)
[PTL 2] Japanese Unexamined Patent Publication No. 2005-67334 (page 7, FIG. 1)
[PTL 3] Japanese Unexamined Patent Publication No. 2004-231043 (pages 4 to 5, FIGS. 1 and 2)
[PTL 4] Japanese Unexamined Patent Publication No. 2006-1518 (page 2, FIG. 1)
[PTL 5] Japanese Unexamined Patent Publication No. 2008-279848
[PTL 6] Japanese Unexamined Patent Publication No. 2008-213570 (pages 3 to 5, FIG. 2)

SUMMARY OF INVENTION

Problems to be Solved by the Invention

The present invention has been made in view of the above problems. It is an object of the present invention to provide a stable steering environment, a drive mechanism capable of improving the operation rate of a power source and an omnidirectional moving vehicle using this drive mechanism by enabling steering of a single wheel by differential drive without using a planetary gear mechanism.

Means for Solving the Problems

A steerable drive mechanism of the present invention comprises a rotatable steering unit; a wheel supported by the steering unit; a drive member rotating about an axis extending along a center axis of the steering unit; and an output shaft located at a position eccentric from the center axis of the steering unit and transmitting rotational force obtained from the drive member to the wheel, the drive member comprising a first drive unit driven in a forward rotation direction and a second drive unit driven in a reverse rotation direction and located coaxially with the first drive unit, and the output shaft being provided with a first output unit to which driving force is transmitted from the first drive unit, and a second output unit to which driving force is transmitted from a conversion unit for converting the rotation direction of the second drive unit into a forward rotation direction, being restricted by the first and second output units, and transmitting rotational force obtained from the output units to the wheel.

According to this construction, the output shaft is restricted by the two different output units. Therefore, when the numbers of rotations of the first and second output units are equal to each other, the output shaft rotates about a constant point. However, when the number of rotations of the first output unit and that of the second output unit are different from each other, the output shaft moves in a circumferential direction of the center axis of the steering unit as a center in accordance with a difference between these numbers of rotations. This move in the circumferential direction rotates the steering unit and changes the direction of the wheel supported by the steering unit. It should be noted that "the output shaft is 'restricted' by the first and second output units" means that by fixing the output units on the output shaft, the output shaft is provided with rotational force from both the output units.

The aforementioned invention can be constructed such that the first and second drive units can individually obtain driving force from different power sources whose numbers of rotations are individually controlled. According to this construction, since the numbers of the rotations to be output from the first and second output units can be individually controlled, a difference can be produced between the numbers of rotations of both the output units by controlling one or both of the first and second drive units.

The aforementioned invention can also be constructed such that when the numbers of rotations of the first and second drive units are equal to each other, the first and second output units rotate at the same number of rotations. According to this construction, in an ordinary running mode, that is, a rectilinear travel mode, the driving forces to be given to the two drive units are equal to each other and the different power sources operate at the same level, so the operation rate of the power sources improves.

Moreover, in the aforementioned invention, all of the first and second drive units, the conversion unit, and the first and second output units can be constituted by spur gears. According to this construction, the center axis of the steering unit can constitute a support shaft of both the drive units, and the center axis of the steering unit can be arranged in parallel with the output shaft, and as a result, a difference between the numbers of rotations of the two output units can be reflected in steering.

In this case, a ratio of the number of teeth of the first drive unit to that of the first output unit can be equal to a ratio of the number of teeth of the second drive unit to that of the conversion unit, and the number of teeth of the conversion unit and that of the second output unit can be equal to each other. With this construction, upon giving driving force of the same number of rotations to the first and second drive units, the number of rotations of the first output unit and that of the second output unit can be equal to each other. When a difference is produced between the numbers of rotations of the first and second drive units, this difference becomes a difference between the number of rotations of the first and second output units, and accordingly adjustment of steering angle can be carried out by controlling the numbers of rotations of the two drive units.

In each aspect of the abovementioned invention, the wheel can have a ground contact point at an offset position from the center axis of the steering unit. In this case, the steering unit rotates around the ground contact point of the wheel and when the direction to travel is changed, trajectory of the ground contact point, which is changed by rolling motion of the wheel, and that of a center of the abovementioned steering unit are different from each other, so the center of the steering unit can be rectilinearly moved toward a desired direction.

In a steerable drive mechanism constructed such that all of the first and second drive units, the conversion unit, and the first and second output units can be constituted by spur gears, a ratio of the number of teeth of the first drive unit to that of the first output unit is equal to a ratio of the number of teeth of the second drive unit to that of the conversion unit, and the number of teeth of the conversion unit and that of the second output unit are equal to each other, when the wheel has a ground contact point at an offset position from the center axis of the steering unit, the amount of the offset can be a length obtained by multiplying a ratio of the number of teeth of the first drive unit to that of the first output unit by a radius of the wheel. With this construction, force to travel obtained by rolling motion of the wheel and steering force obtained by rotation of the steering unit can equally act on the support shaft of the wheel in the offset position. Thus, in steering while running, steering force comparable to force to travel can be given to the wheel.

The abovementioned invention can also be constructed such that the output shaft has a bevel gear at a wheel side end thereof, and transmits rotational force to the wheel by way of a bevel gear in engagement with the bevel gear of the output shaft. According to this construction, even when an axis of the output shaft is provided in an orthogonal direction to a rotational direction of the steering unit, rotational force of the output shaft can be transmitted to the wheel having a horizontal wheel axis, while changing the rotational direction.

On the other hand, an omnidirectional moving vehicle of the present invention is an omnidirectional moving vehicle having any one of the abovementioned steerable drive mechanisms, and comprises a vehicle body and a plurality of wheels, at least two wheels of the plurality of wheels being equipped with the driving mechanism.

With the omnidirectional moving vehicle having the above construction, constituting part of the wheels with passive ones enables the passive wheels to follow in a direction determined by steering of the wheels equipped with the aforementioned drive mechanisms. On the other hand, equipping all the wheels with the abovementioned mechanisms allows burden of the driving force to be dispersed. In addition, because the direction of the respective wheels can be individually controlled, a variety of direction changes can be made by various forms of control.

Another omnidirectional moving vehicle of the present invention is an omnidirectional moving vehicle having wheels equipped with any one of the abovementioned steerable drive mechanisms, and comprises a vehicle body; four wheels; pairs of motors each pair respectively providing driving force to the first and second drive units of each of the wheels; rotation number detecting means for detecting the number of rotations of each of the motors; angle detecting means for detecting steering angle of the steering unit; control means for controlling the number of rotations of each of the motors; and an operation unit for giving an instruction to the control means.

According to the above construction, four wheels are individually controlled and two motors per wheel respectively provide driving force to the drive units, so the numbers of rotations of the first and second drive units can be controlled by controlling the numbers of rotations of the two motors. Besides, the numbers of rotations of the motors are detected by the rotation number detecting means, target values and real numbers of rotations can be compared with each other. Moreover, because steering angle is detected by the angle detecting means, steering angle can be adjusted while controlling the numbers of rotations of the two motors with respect to each of the wheels.

The above invention can be constructed such that the control means individually controls the four wheels upon the instruction from the operation unit. The words "individually controls" herein mean to control the motors which provide driving force to the respective wheels, based on target values which vary by the wheels, and does not mean to have four control units.

According to the above construction, the respective wheels are controlled with an exact direction and speed in order to realize movement based on the instruction, and by independently operating the respective wheels, the respective wheels can be put in a suitable state for not only rectilinear movement but also circular movement.

The omnidirectional moving vehicle of the aforementioned invention can be constituted by a vehicle body of a wheelchair having a seat unit. This allows a wheelchair to move in all directions. The omnidirectional moving vehicle of the aforementioned invention can also be constituted by a vehicle body of a transportation vehicle having a container unit of a predetermined capacity. This allows a transportation vehicle to move in all directions.

Advantageous Effects of Invention

According to the drive mechanism of the present invention, steering is enabled by differential drive of the output units, so steering environment can be stabilized. Besides, since the drive units, the conversion unit, and the output units are constituted by spur gears and the steering unit is rotated by a difference between the numbers of rotations of the output units, differential drive is achieved without using a planetary gear mechanism. In this case, when the numbers of rotations to be given to the first and second drive units are made equal to each other by making a ratio of the number of teeth of the first drive unit to that of the first output unit equal to a ratio of the number of teeth of the second drive unit to that of the second output unit (the number of teeth of the conversion unit is the same as that of the second output unit), the numbers of rotations of the first and second output units can be made equal to each other. This facilitates control of the numbers of rotations and, in a non-steering mode, operates different power sources simultaneously at the same level. Thus, the operation rate of the power sources can be improved while the burden of the power sources is dispersed.

On the other hand, according to the omnidirectional moving vehicle of the present invention, steering is enabled by the drive mechanism equipped on wheels. When the vehicle includes a passive wheel, the direction of the vehicle body is changed by the wheels whose direction is changed by the drive mechanism, and the passive wheel follows in the changed direction, so the whole vehicle body can make a change of direction. When the vehicle does not include any passive wheel, the respective wheels individually change the direction, so which direction to move in can be arbitrarily selected irrespective of the direction of the vehicle body.

By using a vehicle body of a wheelchair, a wheelchair capable of moving in all directions can be constructed. This omnidirectional wheelchair enables people to move even in places which cannot offer sufficient space such as ordinary houses and apartments. Moreover, by constituting an omnidirectional transportation vehicle with a vehicle body having a container unit, transportation in a small space is realized in a field of floor transportation in production facilities and so on.

MODES FOR CARRYING OUT THE INVENTION

Figure 1:
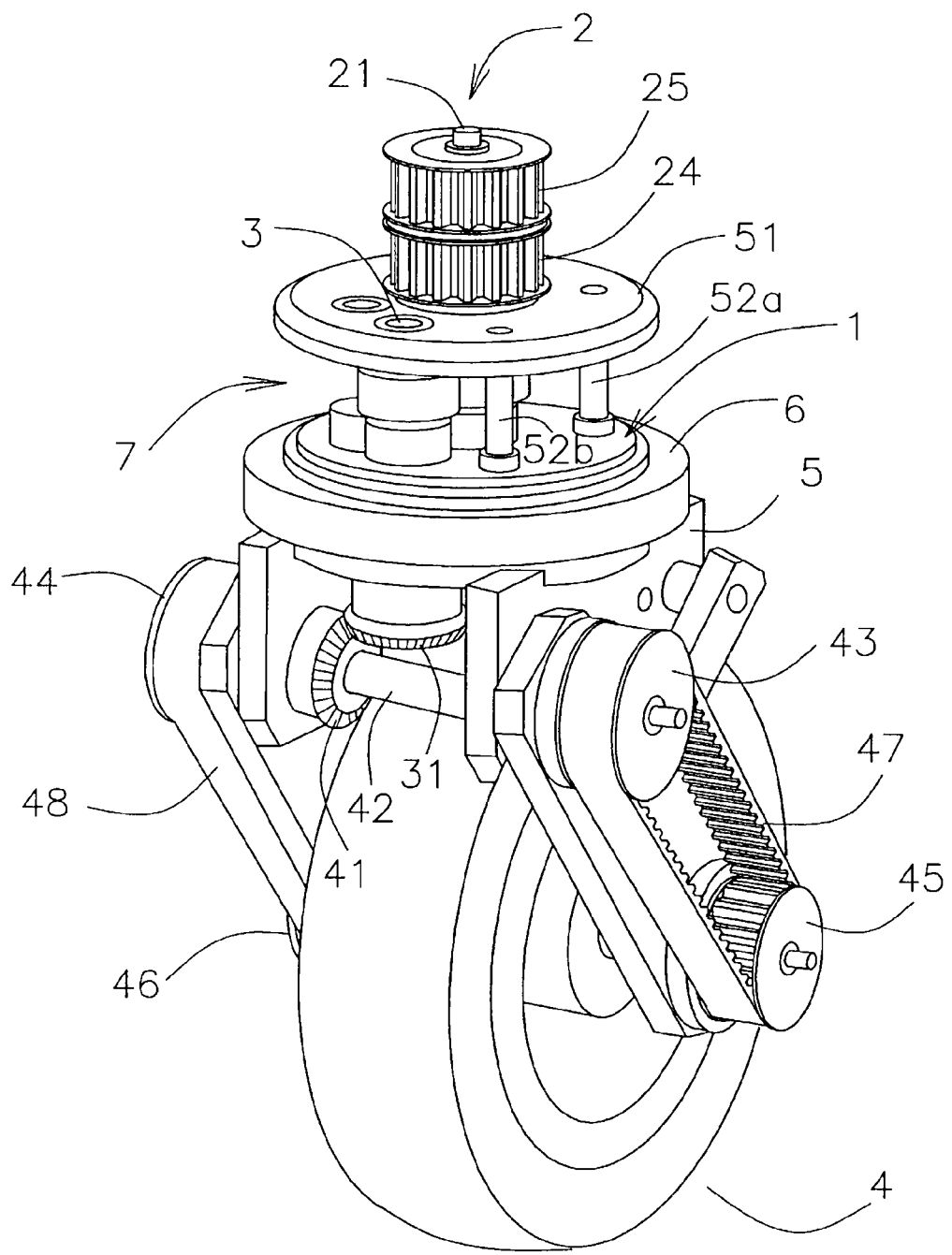
FIG. 1 is a perspective view of a drive mechanism according to an embodiment of the present invention.

Hereinafter, embodiments of the present invention will be described with reference to the drawings. FIG. 1 illustrates a drive mechanism according to an embodiment of the present invention. As shown in this figure, the drive mechanism of this embodiment comprises a rotatable steering unit 1; a drive member 2 rotating about an axis extending along a center axis of the steering unit 1; an output shaft 3 located at a position eccentric from the center axis of the steering unit 1; and a wheel 4 to which rotational force is transmitted from the output shaft 3. The steering unit 1 is arranged on a surface of a vehicle body base 6 rotatably about a support shaft 21 of the drive member 2 as an axis, and when the output shaft 3 moves in a circumferential direction around the support shaft 21 of the drive member 2 as a center, the steering unit 1 is constructed to be rotated by this move. The steering unit 1 supports the wheel 4 by way of a wheel frame 5 and the rotation of the steering unit 1 changes the direction of the wheel frame 5. Above the steering unit 1, a plate 51 is provided in a manner to form an integral body with the steering unit 1 by way of support posts 52a, 52b, and supports the drive member 2 and the output shaft 3.

The output shaft 3 is provided with output units 7 which rotate in association with the drive member 2, and rotational driving force transmitted to the output shaft 3 can rotate a horizontal shaft 42 by way of a bevel gear 31 provided at a lower end of the output shaft 3 and another bevel gear 41 in engagement with the bevel gear 31. Both ends of the horizontal shaft 42 are provided with pulleys (toothed pulleys) 43, 44, and between these pulleys 43, 44 and pulleys (toothed pulleys) 45, 46 provided on a shaft of the wheel 4, belts (toothed belts) 47, 48 are taut so as to rotate the wheel 4.

Figure 2:
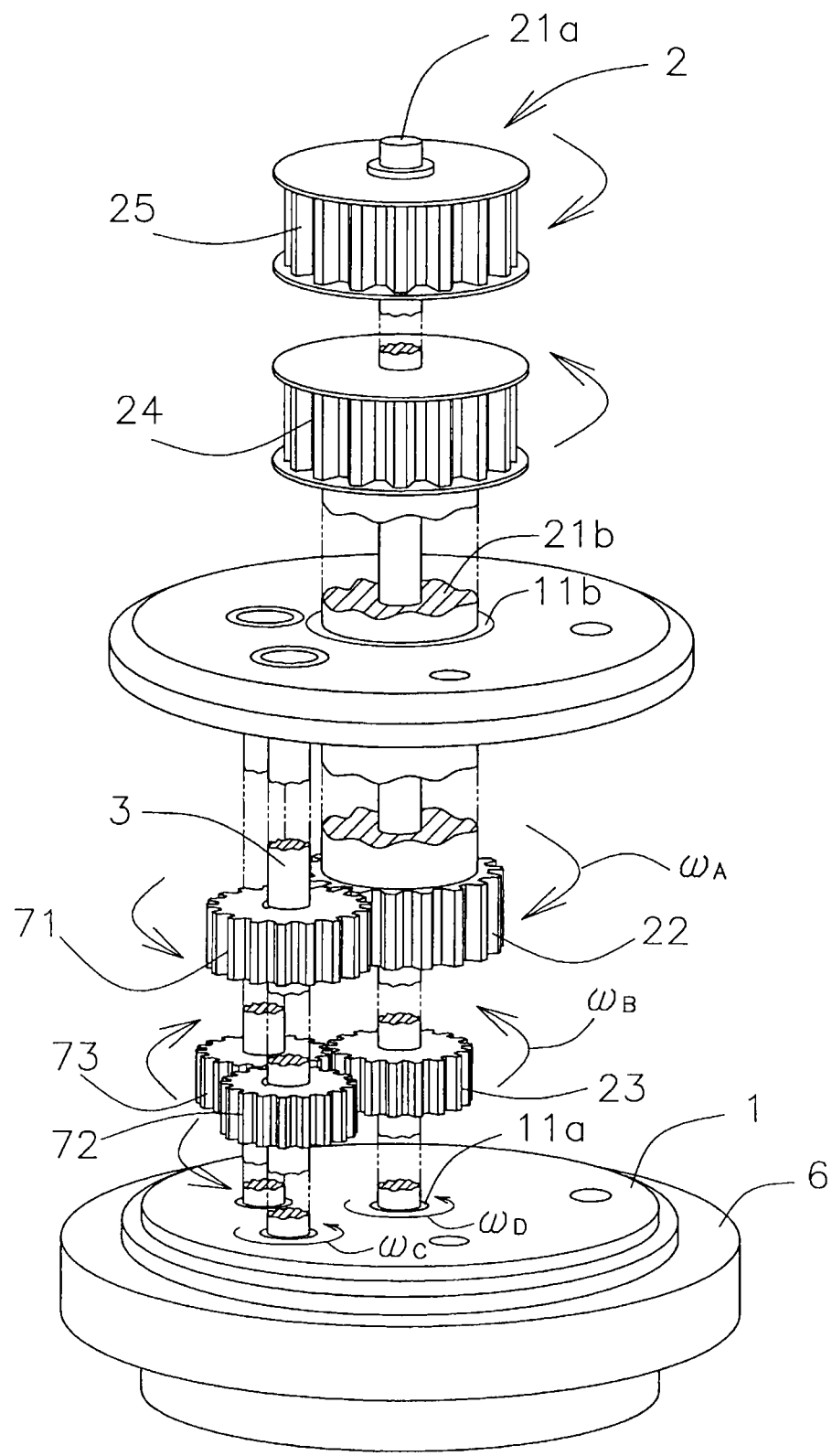
FIG. 2 is an exploded perspective view illustrating drive system from drive units to an output shaft.

Here, a driving force transmitting mechanism from the drive member 2 to the output shaft 3 will be discussed. Component parts arranged above the vehicle body base 6 are shown in FIG. 2. As shown in this figure, support shafts 21a, 21b for supporting the drive member 2 by way of bearings 11a, 11b are disposed at a center of the steering unit 1. In order to coaxially arrange the drive units 22, 23, the support shaft 21b for supporting the second drive unit 23 penetrates inside of the support shaft 21a for supporting the first drive unit 22.

The drive member 2 comprises the two drive units 22, 23, and in order to provide driving force to the drive units 22, 23, pulleys (toothed pulleys) 24, 25 are respectively provided on their input sides (upper ends), and rotational force of motors (not shown) are transmitted to these pulleys 24, 25 by way of toothed belts (not shown). Rotational directions of the upper (first) drive unit 22 and the lower (second) drive unit 23 are adjusted so that the two drive units 22, 23 are driven to rotate in relatively opposite directions to each other. It is to be noted that a rotational direction of the first drive unit 23 is defined as a forward rotation direction and an opposite direction to the forward rotation direction is defined as a reverse rotation direction. Even when the first drive unit 23 rotates backward, this rotational direction is defined as a forward rotation direction and an opposite direction to this direction is defined as a reverse rotation direction.

The first and second drive units 22, 23 are both constituted by spur gears. The first drive unit 22 engages with an upper (first) output unit 71 constituted by a spur gear. The second drive unit 23 engages with a conversion unit 73 constituted by a spur gear, and the conversion unit 73 engages with a lower (second) output unit 72 constituted by a spur gear. Thus, reverse rotation of the second drive unit 23 is converted into forward rotation by the conversion unit 73 and then transmitted to the second output unit 72. These output units 71, 72 are fixed on the single output shaft 3, and the output shaft 3 is restricted by both the output units 71, 72. The term "restricted" means that by fixing the output units 71, 72 on the output shaft 3, the output shaft 3 is provided with rotational force from both the output units 71, 72, and as shown in the figure, the fixing is made with keys. When the output shaft 3 is thus restricted, a difference between provided rotational forces acts on the output shaft 3 as torsional stress.

As mentioned above, this embodiment is constructed such that the drive units 22, 23, the output units 71, 72 and the conversion unit 73 work in association with each other by tooth engagement. Therefore, a ratio of the numbers of teeth of the respective gears in engagement with each other determines numbers of rotations of the output units 71, 72. Under these circumstances, the number of teeth of the conversion unit 73 is made equal to that of the output unit 72, and then a ratio of the number of teeth of the second drive unit 23 to that of the second output unit 72 is made equal to a ratio of the number of teeth of the first drive unit 22 to that of the first output unit 71. Owing to this construction, when the numbers of rotations of power sources (motors not shown) providing power to the drive units 22, 23 are made equal to each other, the number of rotations of the first output unit 71 and that of the second output unit 72 are equal to each other.

In a structure where the respective units 22, 23, 71 72, 73 having the tooth number ratios mentioned above engage with each other, when the number of rotations of the first drive unit 22 and that of the second drive unit 23 are different from each other, torsional stress acts on the output shaft 3 and in order to relieve this stress, the output shaft 3 rotates in a circumferential direction around a center of the steering unit 1. This is rotational power output to the steering unit 1 for steering. That is to say, for example, when the number of rotations of the first drive unit 22 is decreased, the number of rotations of the first output unit 71 also decreases, and a difference is produced between the number of rotation of the output unit 71 and that of the second output unit 72. Then, if the output shaft 3 moves in the same direction as the rapidly rotating second drive unit 23, the relative number of rotations of the rapidly rotating second drive unit 23 and the output shaft 3 decreases and the relative number of rotations of the slowly rotating first drive unit 22 and the output shaft 3 increases and when these relative numbers of rotations are equal to each other, the rotational environment is stabilized. The output shaft 3 thus rotates in either direction in accordance with a difference produced between the number of rotations of the first drive unit 22 and that of the second drive unit 23 and as a result, outputs rotational force to the steering unit 1 for steering.

The abovementioned rotation of the steering unit 1 is remarkable when only one of the first drive unit 22 and the second drive unit 23 is driven and the other is stopped. That is to say, when the first drive unit 22 is stopped, rotational force of the second drive unit 23 is transmitted to the output shaft 3 and the output shaft 3 is driven to rotate but is not permitted to rotate by the first output unit 71, and as a result, the output shaft 3 is rotated, while rolling around the stopped first drive unit 22. This rolling motion serves to rotate the steering unit 1 around the drive unit 22 (the support shaft 21) as a center.

This will be explained using a kinematic model. As premises, $\omega_A$ is the number of rotations of the first drive unit 22, $\omega_B$ is the number of rotations of the second drive unit 23, $\omega_C$ is the number of rotations of the output shaft 3, $\omega_D$ is the number of rotations of the steering unit 1, $Z_A$ is the number of teeth of the first drive unit 22, $Z_B$ is the number of teeth of the second drive unit, $Z_{C1}$ is the number of teeth of the first output unit 71, and $Z_{C2}$ is the number of teeth of the second output unit 72. Furthermore, a state vector $\omega_P$ and an input vector $U_p$ of the mechanism are expressed in the following formulas:

$$\omega_P = [\omega_C \omega_D]^T$$

$$u_P = [\omega_A \omega_B]^T \quad \text{[Math. 1]}$$

Under these conditions, a kinematic model is as follows:

$$\omega_P = B_P u_P \quad \text{[Math. 2]}$$

where $$B_P = \begin{pmatrix} \dfrac{(Z_B - Z_{C2})Z_A}{Z_A Z_{C2} + Z_B Z_{C1}} & \dfrac{(Z_A + Z_{C1})Z_B}{Z_A Z_{C2} + Z_B Z_{C1}} \\ -\dfrac{Z_A Z_{C2}}{Z_A Z_{C2} + Z_B Z_{C1}} & \dfrac{Z_B Z_{C1}}{Z_A Z_{C2} + Z_B Z_{C1}} \end{pmatrix}$$

Here, the number of rotations of the steering unit 1 alone can be expressed in the following equation:

$$\omega_D = -\dfrac{Z_A Z_{C2}}{Z_A Z_{C2} + Z_B Z_{C1}} \omega_A + \dfrac{Z_B Z_{C1}}{Z_A Z_{C2} + Z_B Z_{C1}} \omega_B \quad \text{[Math. 3]}$$

In this equation, if a ratio of the number of teeth of the first drive unit 22 and that of the first output unit 71 is equal to a ratio of the number of teeth of the second drive unit 23 and that of the second output unit 72, then $$\dfrac{Z_{C1}}{Z_A} = \dfrac{Z_{C2}}{Z_B} \quad \text{[Math. 4]}$$

By substituting this in the equation of [Math. 3], we obtain the following equation, and when a difference is produced between the number of rotations $\omega_A$ of the first drive unit 22 and the number of rotations $\omega_B$ of the second drive unit 23, the steering unit 1 rotates in a forward (−) direction or a reverse (+) direction. It is to be noted that as apparent from this equation, when both the numbers of rotations are the same ($\omega_A = \omega_B$), then $\omega_D = 0$, which means that the steering unit 1 does not rotate.

$$\omega_D = -\dfrac{1}{2}\omega_A + \dfrac{1}{2}\omega_B \quad \text{[Math. 5]}$$

On the other hand, from the formula of [Math. 2], the rotation of the output shaft 3 is expressed as follows:

$$\omega_C = \dfrac{(Z_B - Z_{C2})Z_A}{Z_A Z_{C2} + Z_B Z_{C1}} \omega_A + \dfrac{(Z_A + Z_{C1})Z_B}{Z_A Z_{C2} + Z_B Z_{C1}} \omega_B \quad \text{[Math. 6]}$$

When a ratio of the number of teeth of the first drive unit 22 and that of the first output unit 71 is equal to a ratio of the number of teeth of the second drive unit 23 and that of the second output unit 72 and the equation of [Math. 4] is substituted into the above equation, then we obtain the following equation, which means that half the numbers of rotations of the drive units 22, 23 are respectively transmitted to the output shaft 3 in a reverse (+) direction.

$$\omega_C = \dfrac{1}{2}\left(\dfrac{Z_A}{Z_{C1}} - 1\right)\omega_A + \dfrac{1}{2}\left(\dfrac{Z_B}{Z_{C2}} + 1\right)\omega_B \quad \text{[Math. 7]}$$

In this equation, when the number of rotations of both the drive units 22, 23 are the same ($\omega_A = \omega_B = \omega_O$), half the numbers of rotations of the respective drive units 22, 23 are transmitted as shown in the following equation.

$$\omega_C = \dfrac{1}{2}\left(\dfrac{Z_A}{Z_{C1}}\omega_O + \dfrac{Z_B}{Z_{C2}}\omega_O\right) \quad \text{[Math. 8]}$$

Upon making the number of rotations of the first drive unit 22 and that of the second drive unit 23 equal to each other, both the output units 71, 72 output to the output shaft 3 driving force having the same direction and the same number of rotations. In this case, rotational force in a circumferential direction around the center of the steering unit 1 as an axis is not generated at the output shaft 3. In contrast, when the two drive units 22, 23 differ from each other in the number of rotations (as a result, the output units 71, 72 differ from each other in the number of rotations), the output shaft 3 moves so as to rotate the steering unit 1.

Figure 3:
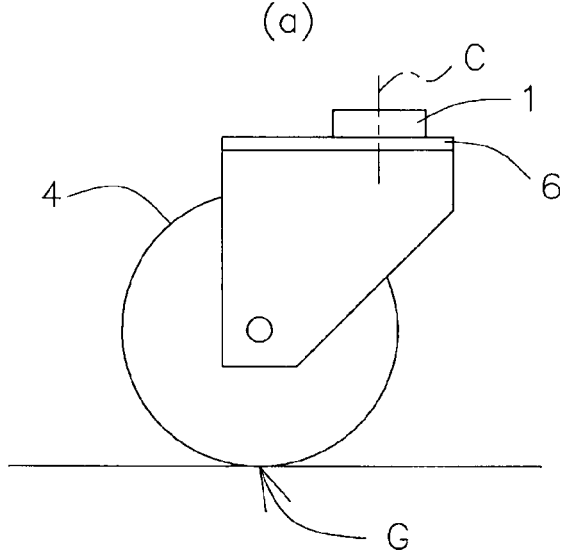
FIG. 3 are explanatory views illustrating some states of a wheel.
Figure 3:
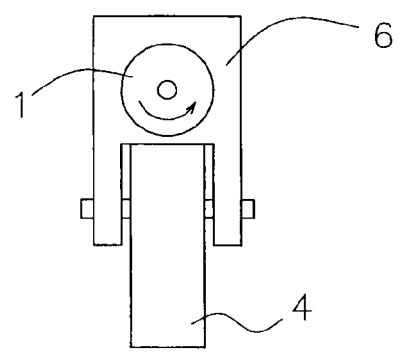
Figure 3:
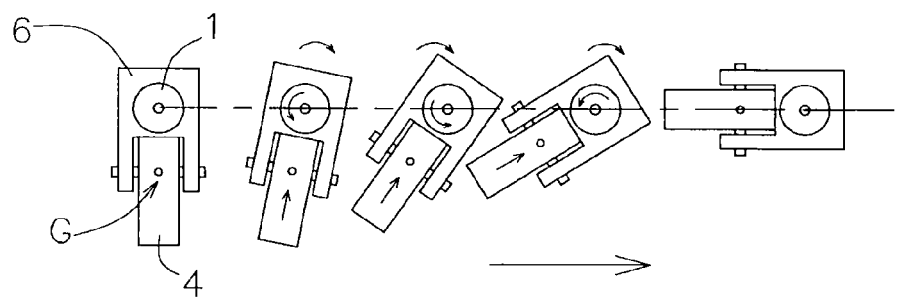

If a ground contact point of the wheel 4 were located on a centerline of the steering unit 1, the abovementioned rotation of the steering unit 1 would change the direction of the wheel 4. However, when the ground contact point G of the wheel 4 is located at an offset position from the center C of the steering unit 1 as shown in FIG. 3(a), the situation is different from the above. It should be noted that locating the ground contact point G of the wheel 4 at an offset position is necessary for the vehicle body base 6 to move in all directions without wasting motion, as mentioned later.

It is difficult to change the direction of the wheel 4 having a ground contact point at an offset position as shown in FIG. 3(b), because it needs to move the ground contact point and its resistance is great. However, rotational force generating at the steering unit 1 acts so as to horizontally rotate the entire wheel 4 around the ground contact point as a center, and this horizontal rotation of the wheel 4 acts to move a center point of the steering unit 1. This reactive move of the position of the steering unit 1 changes the position and direction of the wheel 4 with respect to the wheel body base 6.

Moreover, upon locating the ground contact point of the wheel 4 at an offset position, as shown in FIG. 3(c), in changing the direction of the wheel 4, the vehicle body base 6 (a center of the steering unit 1) moves rectilinearly in a desired direction (the right direction in the figure). This is suitable in changing the direction from a stopped state. That is to say, the wheel 4 which has stopped rotating contacts the ground two-dimensionally in a width direction and requires enough rotational force to overcome frictional resistance in order to change the direction of the wheel 4. As is well known, however, when the wheel 4 rolls, the ground contact point is continuously changed and accordingly frictional resistance in a change of direction is small. Therefore, in changing the direction while rolling the wheel 4, locating the ground contact point at an offset position from the steering unit 1 allows rectilinear movement in a desired direction (the right direction in the figure) in spite of rolling of the wheel 4.

Figure 4:
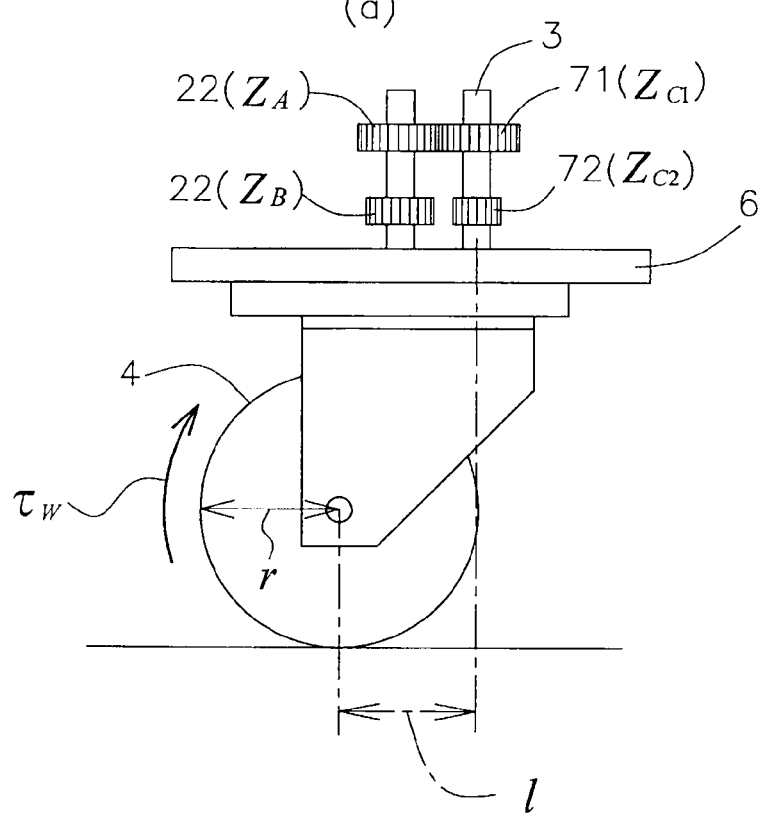
FIG. 4 are explanatory views illustrating an offset of a wheel.
Figure 4:
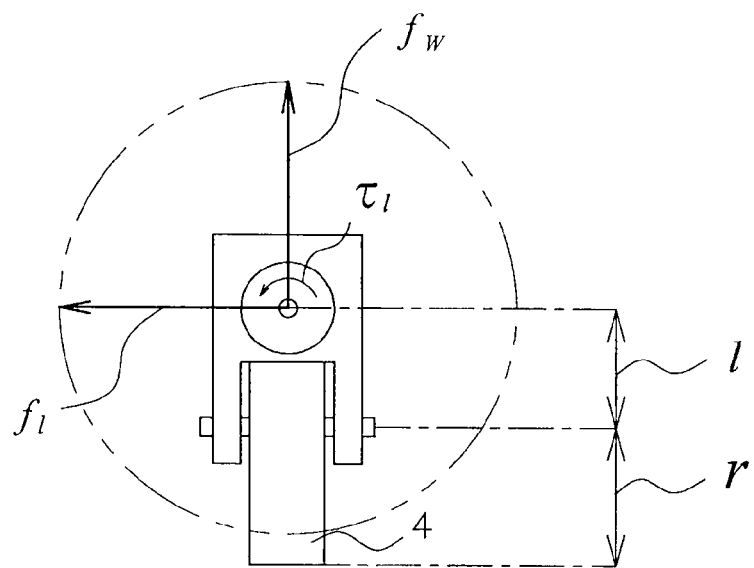

The abovementioned offset position means that the ground contact point G of the wheel 4 is offset from an axis of the center C of the steering unit 1, and as shown in FIGS. 4(*a*), 4(*b*), the amount of the offset is adjusted so as to make force to travel and steering force equal to each other. Owing to making force to travel and the steering force equal to each other, when an instruction for travel and an instruction for steering are given at the same time, movement in accordance with these instructions can be realized by composition of vectors of these forces. That is to say, the abovementioned change of direction can be carried out smoothly. Therefore, the amount of the offset (a distance from an axis of the center C to the ground contact point G) is adjusted to a length obtained by multiplying a ratio of the number of teeth $Z_A$ of the first drive unit 22 to the number of teeth $Z_{C1}$ of the first output unit 71 ($Z_A/Z_{C1}$) by a radius r of the wheel 4. This enables force to travel $f_w$ of rolling motion of the wheel 4 and steering force $f_1$ of the steering unit 1 to be equal to each other.

Namely, the amount of the offset 1 of a length obtained by multiplying a ratio of the number of teeth $Z_A$ of the first drive unit 22 to the number of teeth $Z_{C1}$ of the first output unit 71 ($Z_A/Z_{C1}$) by a radius r of the wheel 4 is expressed as follows:

$$l = r\frac{Z_A}{Z_{C1}} \qquad \text{[Math. 9]}$$

This makes force fw generating from drive torque $\tau_W$ of the wheel 4 and force $f_1$ generating from steering torque $\tau_1$ equal to each other. That is to say, since drive torque $\tau_W$ is a sum of drive torque $\tau_A$ of the first drive unit 22 and drive torque $\tau_B$ of the second drive unit 23, the drive torque $\tau_W$ of the wheel 4 is expressed in the following equation:

$$\tau_W = \frac{Z_{C1}}{Z_A}\tau_A + \frac{Z_{C2}}{Z_B}\tau_B \qquad \text{[Math. 10]}$$

where $$\frac{Z_{C1}}{Z_A} = \frac{Z_{C2}}{Z_B},$$

so $$\tau_W = \frac{Z_{C1}}{Z_A}(\tau_A + \tau_B)$$

On the other hand, since the steering torque $\tau_1$ is a sum of drive torque $\tau_A$ of the first drive unit 22 and drive torque $\tau_B$ of the second drive unit, we obtain $\tau_1 = \tau_A + \tau_B$.

Since force $f_w$ generating from the drive torque $\tau_W$ is calculated by $f_w = \tau_W/r$, and force $f_1$ generating from the steering torque $\tau_1$ is calculated by $f_1 = \tau_1/l$, these forces are expressed as follows:

$$f_W = \frac{\tau_W}{r} = \frac{(\tau_A + \tau_B)}{r}\frac{Z_{C1}}{Z_A} \qquad \text{[Math. 11]}$$

$$f_l = \frac{\tau_l}{l} = \frac{\tau_A + \tau_B}{l}$$

Hence, in order to make these two forces $f_w$, $f_1$ equal to each other, the following equation has to be satisfied, and as a result, the amount of the offset has to be the value shown in [Math. 9].

where [Math. 12]

$$l = r\frac{Z_A}{Z_{C1}},$$

then $$f_l = \frac{\tau_A + \tau_B}{r\frac{Z_A}{Z_{c1}}} = \frac{(\tau_A + \tau_B)}{r}\frac{Z_{C1}}{Z_A}$$

$$\therefore f_W = f_l$$

As mentioned above, the driving force transmitting mechanism of this embodiment is constructed such that rotational force of the wheel 4 which is necessary for travel can be obtained by rotation of the output shaft 3 and such that the steering unit 1 is rotated by a difference between the numbers of rotations of the output units 71, 72, which provide rotational force to this output shaft 3. Therefore, rotational force transmitted from the two drive units 22, 23 can be used for both driving force to travel and driving force to steer.

The drive units 22, 23 of this embodiment are provided with rotational force from power sources (not shown) such as motors. In consideration of rotatably driving the two drive units 22, 23 in different directions and individually controlling the numbers of rotations of the two drive units 22, 23, it is preferable that the abovementioned power sources such as motors are two different ones. The use of two power sources allows load of the driving force to travel to be shared by the two power sources, and since the two power sources are used at the same level of frequency, operation rate of these two power sources are good. Moreover, when compared to the use of two kinds of power sources for travel and for steering, since there is no difference in operation rate, the use of these power sources has an advantage in that service life decreases equally.

Figure 5:
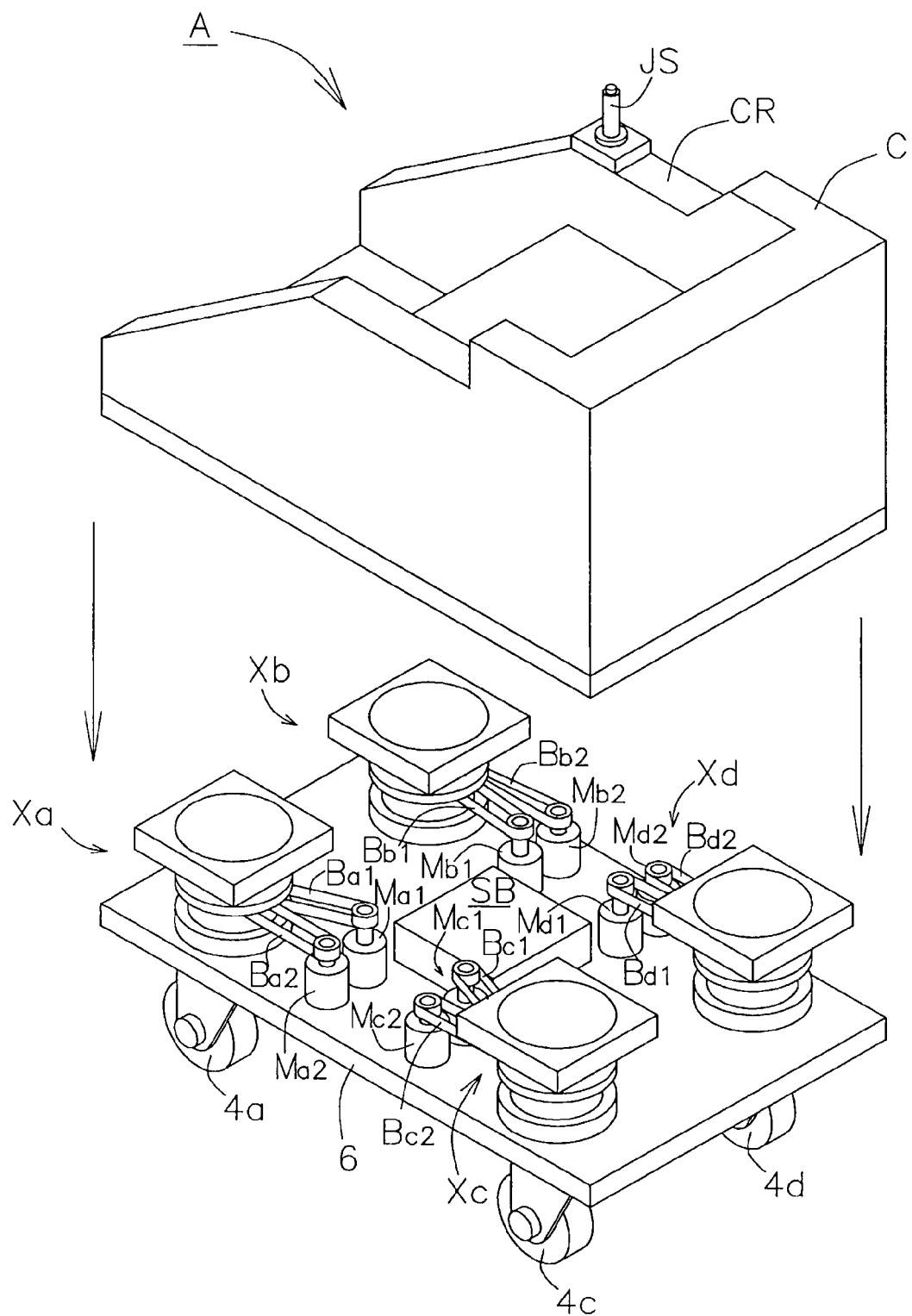
FIG. 5 is an explanatory view illustrating a wheelchair as an omnidirectional moving vehicle according to an embodiment.

Next, a wheelchair will be described as an example of an omnidirectional moving vehicle using the above drive mechanism according to an embodiment. FIG. 5 is an exploded schematic diagram of a wheelchair A. As shown in this figure, the wheelchair A has four wheels 4*a*, 4*b*, 4*c*, 4*d* (the right front wheel 4*b* is not explicitly shown in the figure) on a vehicle body base 6 and the abovementioned drive mechanisms Xa, Xb, Xc, Xd are respectively mounted for the wheels 4*a* to 4*d*. Each of the drive mechanisms Xa to Xd has a steering unit 1, a drive member 2 and an output shaft 3 on an upper side of the vehicle body base 6, and for activating these units, drive units 22, 23, output units 71, 72 and a conversion unit 73 are arranged as in the abovementioned construction (See FIG. 2).

For the drive units 22, 23 of each of the drive mechanisms Xa to Xd, each pair of motors Ma1, Ma2, Mb1, Mb2, Mc1, Mc2, Md1, Md2 are mounted on the vehicle body base 6. Belts (toothed belts) Ba1, Bb1, Bc1, Bd1 are stretched at slightly high positions between the motors Ma1, Mb1, Mc1, Md1, which provide driving force to the first drive units 22, and the aforementioned first pulleys 24 of the drive mechanisms Xa to Xd. On the other hand, belts (toothed belts) Ba2, Bb2, Bc2, Bd2 are stretched between the motors Ma2, Mb2, Mc2, Md2, which provide driving force to the second drive units, and the other pulleys 25. Each of the pairs of motors Ma1 to Md2 rotate in opposite directions to each other in order to rotate the drive unit 22 in a forward direction and the drive unit 23 in a reverse direction.

A control unit (control means) SB is mounted on the vehicle body base 6 and controls the number of rotations of each of the motors Ma1 to Md2. In a case of the left front wheel 4a, for instance, the abovementioned drive mechanism can be realized by adjusting the number of rotations of the two motors Ma1, Ma2. Making the numbers of rotations of the drive units 22, 23 equal to each other rotates only the output units 7, and producing a difference between the relative numbers of rotations of the drive units 22, 23 rotates the steering unit 1.

Furthermore, a wheelchair A as a whole is formed by having a seat unit C mounted on an upper side of the vehicle body base 6 and supported by the vehicle body base 6. A joystick (an operation unit) JS is provided around a right armrest portion CR of the seat unit C and operation of the joystick JS is transmitted to the above control unit SB, which controls the drive mechanisms in accordance with the operation with reference to a kinematic model or an inverse-kinematic model.

As for a method of control, an encoder (rotation number detecting means) is provided for each of the motors Ma1 to Md2 and detects the number of rotations of each of the motors Ma1 to Md2, while an absolute encoder (angle detecting means) is provided for the steering unit 1 and detects steering angle of the wheel. The detected numbers of rotations and steering angle are compared with target values and controlled to reach the target values. Specifically, the joystick JS outputs instructions for rectilinear movement in an X direction and a Y direction which is perpendicular to the X direction, and an instruction for rotational movement (a three degree-of-freedom signal). The control unit SB decomposes these instructions from the joystick JS into the number of rotations $\omega_W$ of the wheel 4 and the number of rotations $\omega_1$ of the steering unit 1, calculates the number of rotations of the first and second drive units 22, 23 from the number of rotations of the wheel 4, and at the same time calculates a difference between the numbers of rotations of the two drive units 22, 23 from the number of rotations of the steering unit 1. In accordance with calculation results, the control unit SB gives instructions for certain rotational output to the motors Ma1 to Md2, which drive the two drive units 22, 23. The numbers of rotations of the respective motors Ma1 to Md2 and the number of rotations of the steering unit are fed back to the control unit SB, which calculates necessary rotational force and controls the motors Ma1 to Md2 so that the respective numbers of rotations reach the target values. The control of the rotational numbers of the motors are carried out by increasing or decreasing current by a programmable logic controller (PLC).

Figure 6:
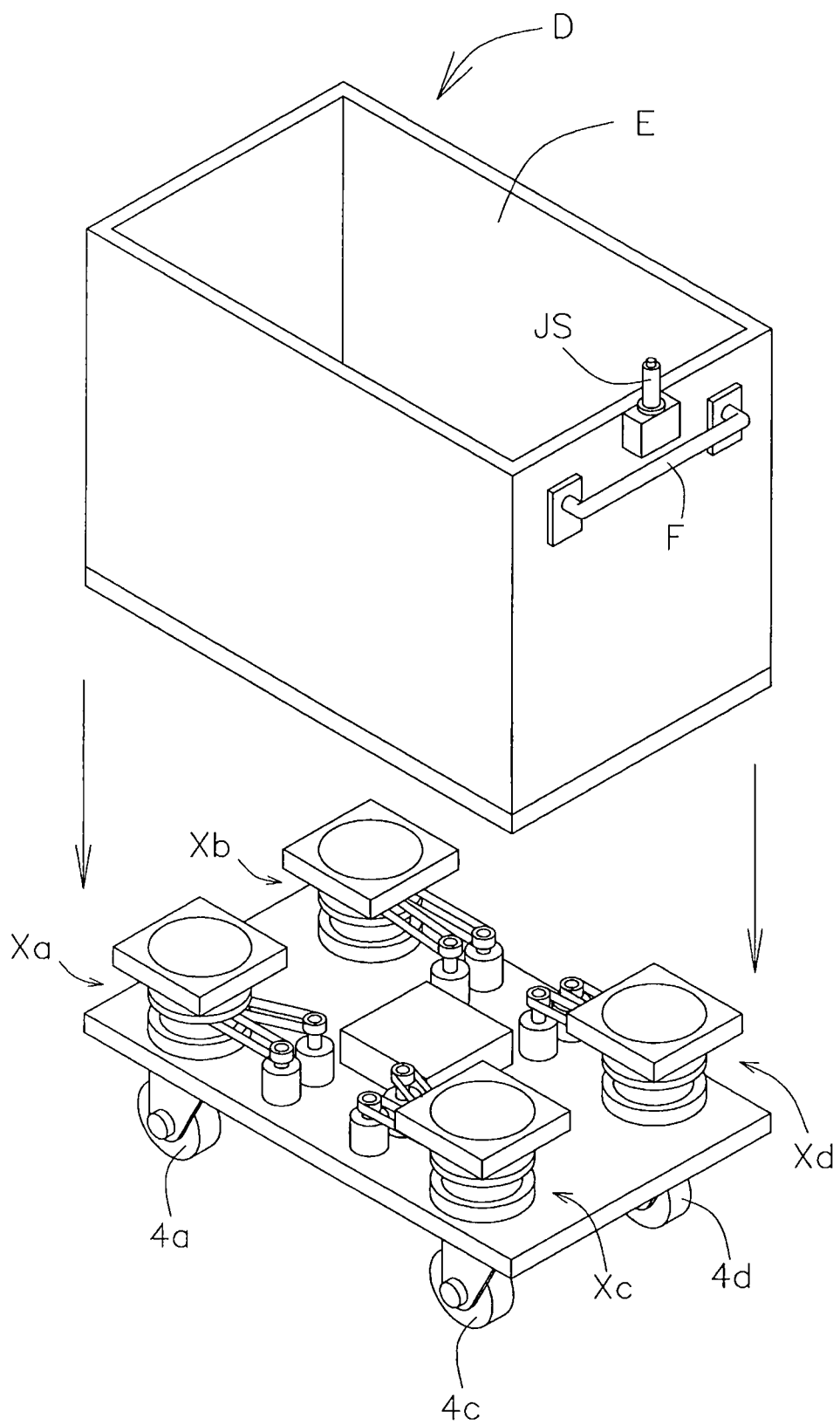
FIG. 6 is an explanatory view illustrating a transportation vehicle as an omnidirectional moving vehicle according to an embodiment.

An embodiment used as a transportation vehicle will also be discussed. As shown in FIG. 6, similarly to the abovementioned wheelchair A, four wheels 4a to 4d are mounted on a vehicle body base 6, and drive mechanisms Xa to Xd are also mounted for respectively controlling these wheels 4a to 4d. Upon mounting a container unit E on the vehicle body base 6, the vehicle serves as a transportation vehicle B. A handle portion F is provided on a side of this container unit E, and a joystick JS is also provided near the handle portion F, such that a user can operate the joystick JS while grasping the handle portion F. Operation of the joystick JS and control of the wheels in accordance with instructions from the joystick JS are similar to those of the wheelchair A.

Next, individual steering states of the four wheels 4a to 4d will be discussed. As mentioned above, control of each wheel 4 is carried out by controlling the number of rotations of each pair of motors for running and steering. Operation instructions have three degrees of freedom: an X direction, a Y direction and a circular (rotational) direction.

Figure 7:
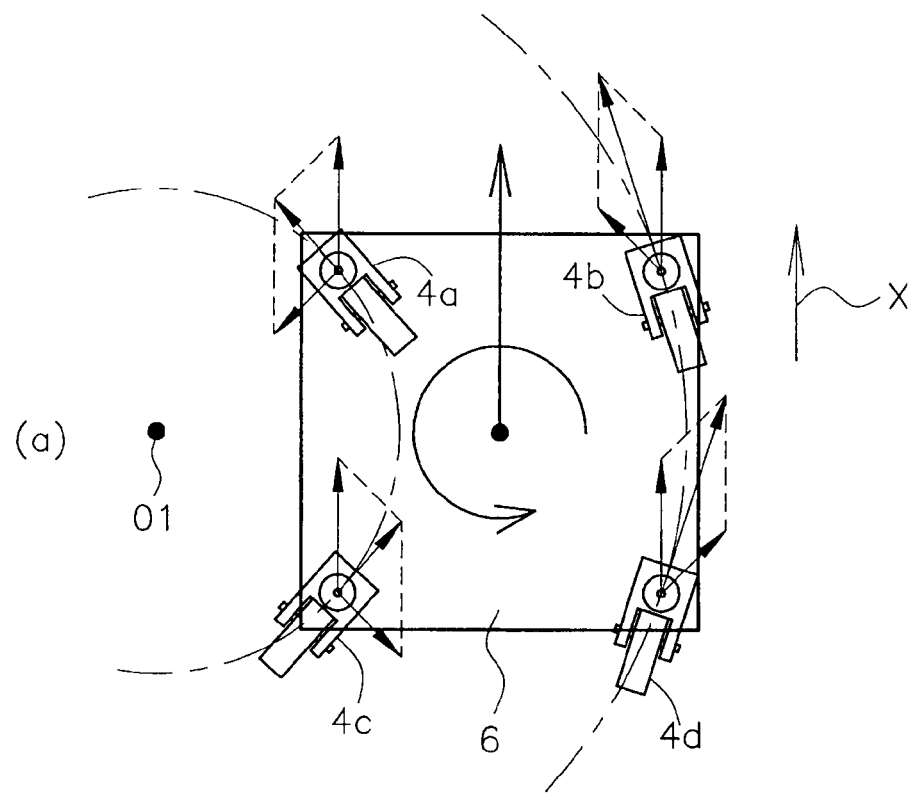
FIG. 7 are explanatory views illustrating steering states of wheels of an omnidirectional moving vehicle.
Figure 7:
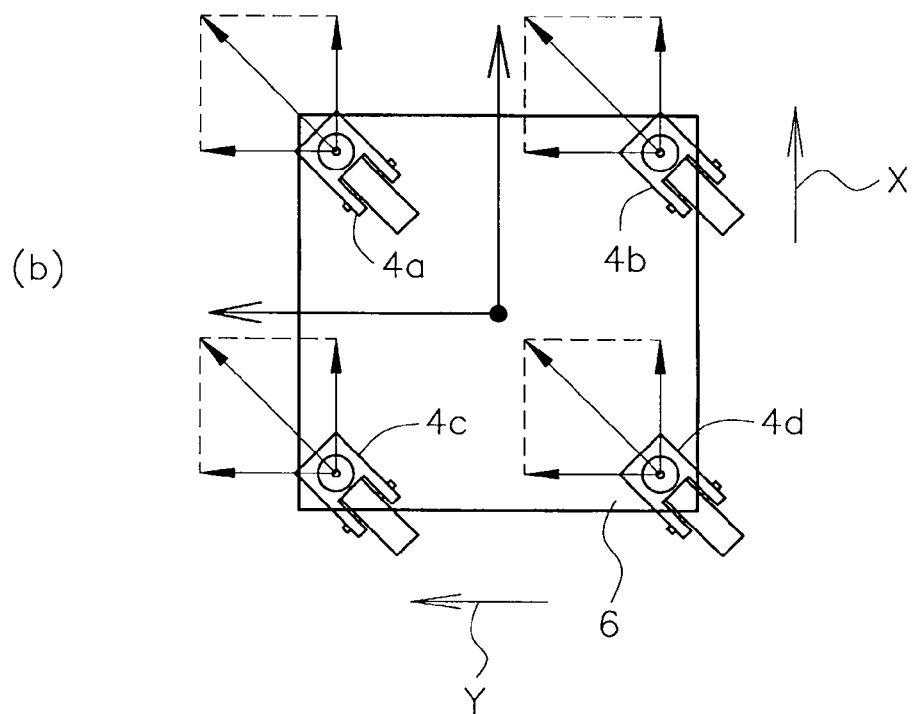

FIG. 7(a) is a vector diagram illustrating an example of how the wheels 4a to 4d move when a bidirectional instruction in an X direction and a rotational direction is given. As shown in this figure, driving force in rotational directions can be expressed as vectors in tangential directions of concentric circles which pass through the output units 7. On the other hand, driving force in the X direction can be expressed as vectors in a rectilinear direction. Movements of the wheels 4a to 4d in accordance with this bidirectional instruction can be expressed by composition of the two vectors.

That is to say, as shown in the figure, the vectors in the X direction are the same at four points, and the vectors in the rotational direction (tangential directions of concentric circles) have different directions but the same magnitude. Respective resultant forces are different vectors in both direction and magnitude. Controlling the direction and rotational speed of the wheels 4a to 4d to meet the direction and magnitude of these vectors enables movement in accordance with the abovementioned bidirectional instruction. It is to be noted that according to the instruction shown in the figure, the vehicle is to move in an arc direction around a point O1, which is located outside of the vehicle body base 6.

In a case where a bidirectional instruction in an X direction and a Y direction is given, as shown in FIG. 7(b), composition of respective two vectors yields four vectors having the same direction and the same magnitude. In this case, since all the wheels 4a to 4d face in the same direction and rotate at the same speed, the vehicle can move in an oblique direction while maintaining its front facing in the X direction and not changing the direction of the vehicle body base 6.

Figure 8:
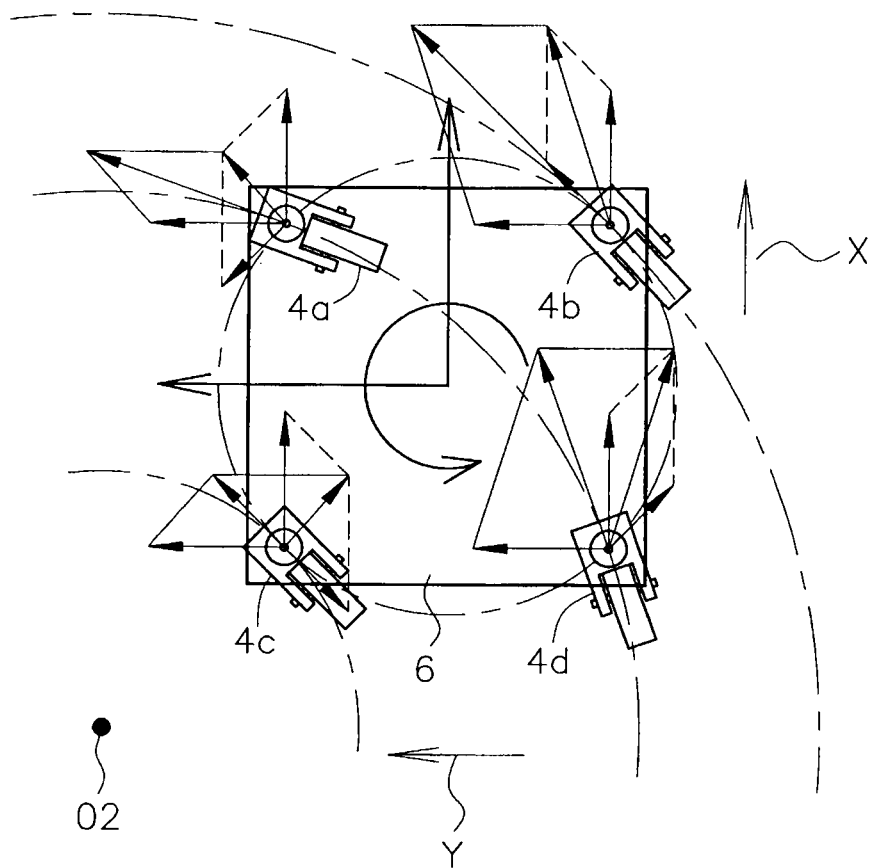
FIG. 8 is an explanatory view illustrating a steering state of wheels of an omnidirectional moving vehicle.

FIG. 8 illustrates an example of how the wheels move when vectors having three degrees of freedom (an X direction, a Y direction and a rotational direction) are given. This figure shows that rectilinear movements in the Y direction are added to the state shown in FIG. 7(a). Accordingly, as shown in FIG. 8, each resultant of three vectors is a net vector obtained by adding the Y-direction vector to the resultant vector shown in FIG. 7(a). By controlling the direction and rotational speed of the wheels 4a to 4d in accordance with the resultant vectors, the vehicle can move in an arc direction around a point O2 located at the left rear of the vehicle body base 6. It is to be noted that in this case, the front of the vehicle body base 6 does not face in an arcuately rotating direction but remains in the X direction by travel distance in the Y direction. The reason is as follows: As typically shown in FIG. 7(b), when vectors in the Y direction are added, unlike the vectors in circular (rotational) directions, the vectors in the Y direction do not change the direction of the vehicle body base 6. Therefore, when vectors having three degrees of freedom are given, the direction of the vehicle body base 6 is not changed by the vectors in the Y direction but slightly changed in a range where the vectors in the rotational direction act.

Figure 9:
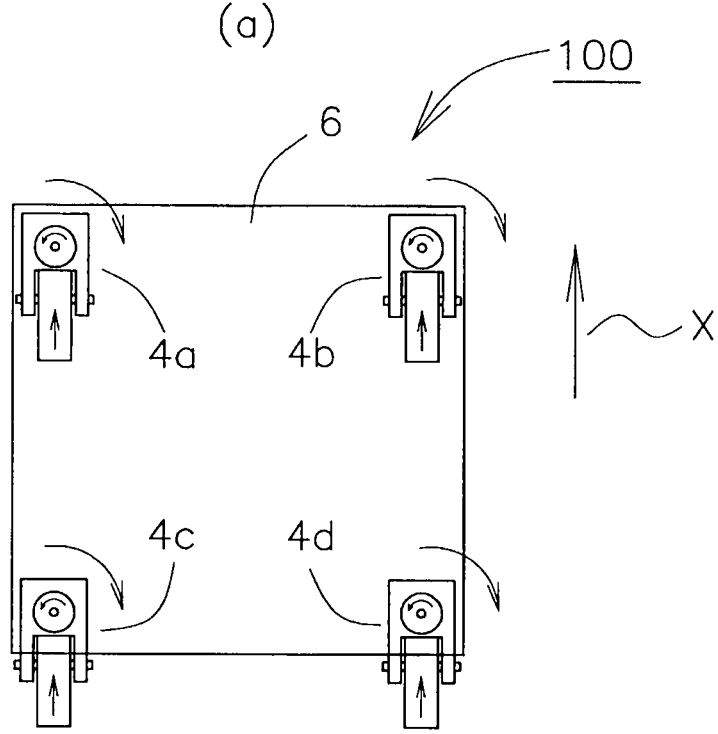
FIG. 9 are explanatory views illustrating operation modes of an omnidirectional moving vehicle according to an embodiment.
Figure 9:
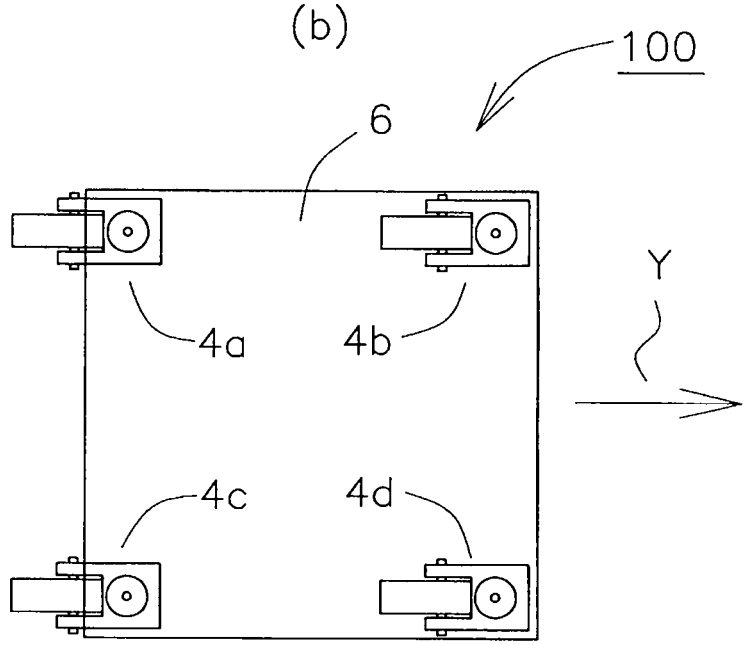

Next, omnidirectional movements will be discussed in respect of such an omnidirectional moving vehicle using the abovementioned drive mechanism as the wheelchair A and the transportation vehicle B mentioned above. FIG. 9 show that a rectangular vehicle body base 6 has four wheels 4a, 4b, 4c, 4d and the abovementioned driving force transmitting mechanisms are mounted for the respective wheels. In an omnidirectional moving vehicle 100 of this figure, the vehicle body base 6 is drawn in straight lines and the wheels 4 are drawn to show the state of the wheels in an easy-to-understand manner. As shown in FIG. 9(a), the driving force transmitting mechanisms are mounted respectively for the four wheels 4a, 4b, 4c, 4d and provide driving force to the wheels 4a to 4d. When the vehicle moves in a rectilinear direction (the X direction in the figure), the driving force transmitting mechanisms rolls the respective wheels 4a, 4b, 4c, 4d in the same direction.

When the direction of the vehicle 100 is to be changed, for example, to a lateral direction (the right direction in the figure), upon rotating the steering unit 1 counterclockwise, this driving force is reactively transmitted to the respective wheels 4a, 4b, 4c, 4d and the wheels 4a to 4d rotate clockwise around their ground contact points. As a result of the respective changes of direction at the four points of the vehicle body base 6, the direction to travel is changed to the lateral direction (the Y direction) while keeping the direction of the vehicle body base 6 as it is (keeping its front face in the X direction) (FIG. 9(b)). In this case, the rolling direction of the wheels 4a to 4d was initially the X direction, but owing to the abovementioned offset (see FIG. 3(c)), the vehicle body base 6 can move from a very original position in the lateral direction (the Y direction).

When the vehicle 100 is to move backward (in an opposite direction to the X direction in the FIG. 9(a)), rotating the drive units 22, 23 (FIG. 1) in opposite directions allows the vehicle 100 to move in the opposite direction. However, repeating the abovementioned lateral movement (the change of direction at 90 degrees) also allows the vehicle 100 to move in the opposite direction (make a change of direction at 180 degrees). It is to be noted that when repeating the change of direction at 90 degrees, the vehicle 100 is to move sideways and then move backward. However, when rotating the drive units 22, 23 in opposite directions, there is no such wasted motion. Furthermore, regarding the travel direction of the wheels 4a to 4d, when a steering shaft side of ground contact points of the wheels 4a to 4d is defined as a front side, upon an instruction to go backward, the rolling direction of the wheels 4a to 4d can be controlled to turn at 180 degrees. In this case, it is preliminarily determined whether the rotating direction of the steering unit 1 of each of the wheels 4a to 4d should give preference to clockwise rotation or counterclockwise rotation.

Figure 10:
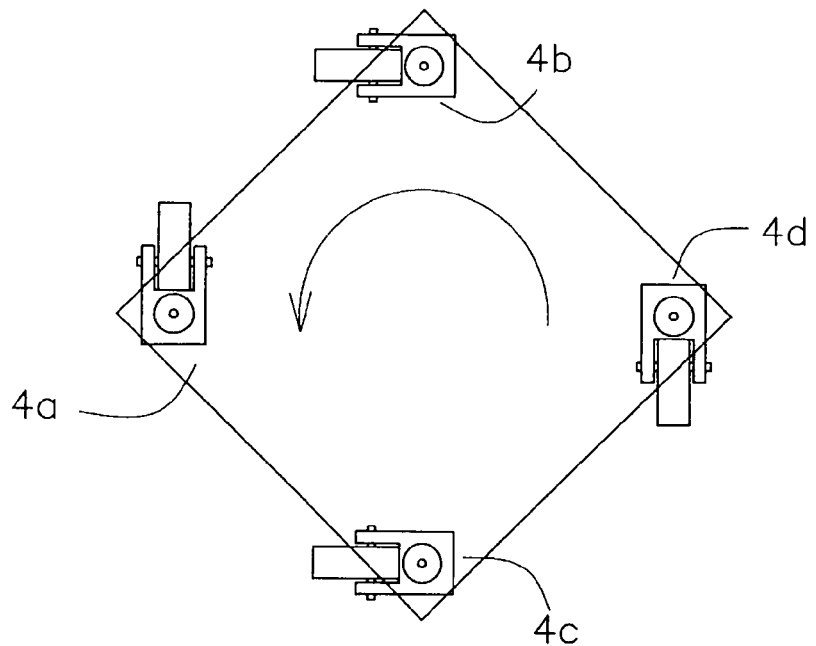
FIG. 10 are explanatory views illustrating operation modes of an omnidirectional moving vehicle according to an embodiment.
Figure 10:
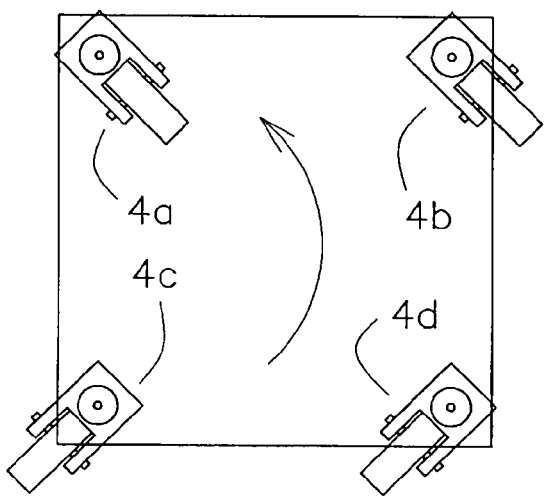

Next, when the vehicle 100 is to turn around, it is enabled by making each of the wheels 4a, 4b, 4c, 4d face in tangential directions of a circle around a center point of the vehicle body base 6 (an areal center in a planar view) as a center (FIG. 10(a)). In this case, since the vehicle 100 can turn around a center of the above vehicle body base 6, a change of direction in a small space is possible. When the direction of the vehicle is to be slightly changed while moving ahead, the direction of each of the wheels 4a, 4b, 4c, 4d can be adjusted to tangential directions of an arc having such a degree of curvature (a desired radius of curvature) (FIG. 10(b)). This kind of combination of a rectilinear movement and a circular movement can be executed by composition of the two vectors, as mentioned before.

Such a change of direction of each of the wheels 4a, 4b, 4c, 4d as mentioned above is made by the abovementioned difference between the numbers of rotations of the drive units 22, 23, and the numbers of rotations of the drive units 22, 23 for each of the wheels 4a, 4b, 4c, 4d are controlled in accordance with a movement selected by a user. The movement selection by a user is carried out, for example, by using a joystick JB as used in the wheelchair A and the transportation vehicle B (see FIGS. 5 and 6). The numbers of rotations of the drive units 22, 23 for each of the wheels 4a, 4b, 4c, 4d can be controlled by operating the joystick JS according to a predetermined operation method.

Figure 11:
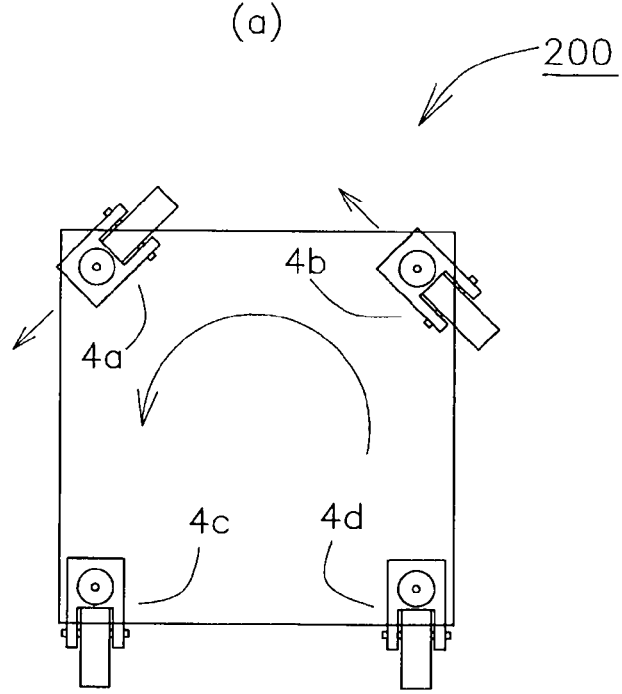
FIG. 11 are explanatory views illustrating an omnidirectional moving vehicle according to another embodiment.
Figure 11:
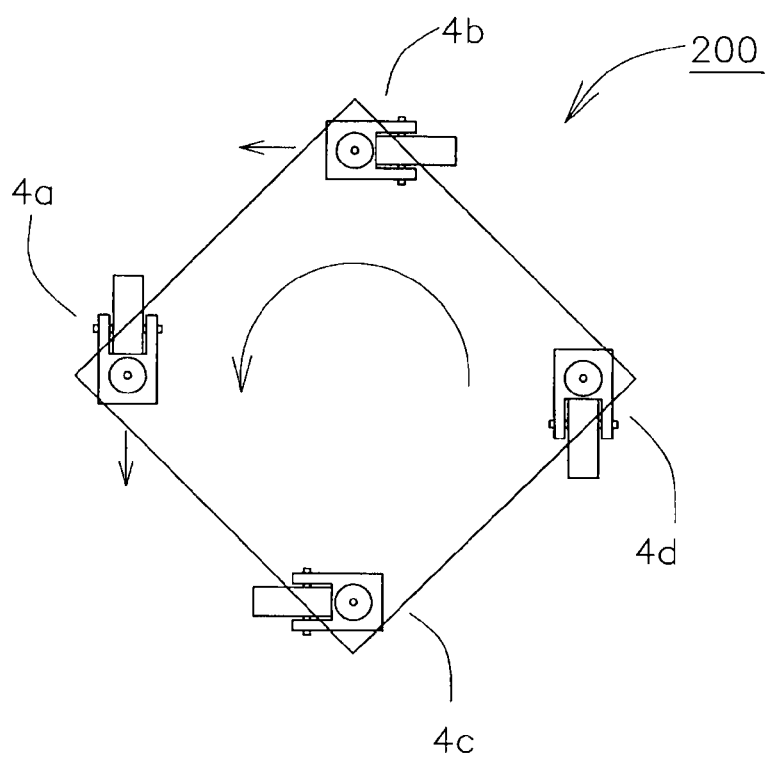

Next, an omnidirectional moving vehicle 200 including passive wheels will be discussed. "Passive wheels" mean wheels which are not provided with the driving force transmitting mechanism of the present invention and are not given any driving force, and we call wheels equipped with the driving force transmitting mechanism "drive wheels" and distinguish drive wheels from passive wheels. In this embodiment, as shown in FIG. 11(a), mounted on a rectangular vehicle body base 6 are two adjacent wheels which are drive wheels 4a, 4b proving driving force and two other wheels which are passive wheels 4c, 4d. The drive wheels 4a, 4b are arranged in front, and direction and travel distance are controlled by these drive wheels 4a, 4b. Each of the drive wheels 4a, 4b used here has a ground contact point at an offset position as mentioned before. Each of the passive wheels 4c, 4d is supported by a rotatable rotary shaft and has a ground contact point at an offset position from the rotary shaft.

Since the drive wheels 4a, 4b are front two, the vehicle body base 6 cannot move in a lateral direction while keeping the vehicle body base 6 face in the direction to travel. However, lateral movement is achieved by changing the travel direction of the front of the vehicle body base 6 into a lateral direction. This change of direction can be made, while making a circular movement in a small space, by controlling the direction of the drive wheels 4a, 4b in tangential directions of a circle around a center point (an areal center in a planar view) of the vehicle body base 6 (FIG. 11(a)). The reason is that since the passive wheels 4c, 4d freely change their direction so as to have the least resistance in accordance with a movement or a change of the state of the vehicle body base 6, the circular movement of the drive wheels 4a, 4b makes the passive wheels 4c, 4d change their direction to a direction to allow the vehicle body base 6 to make a circular movement (FIG. 11(b)).

Although some embodiments of the present invention have been described above, the present invention is not limited to the above embodiments. Four wheel vehicles are shown as typical examples but the omnidirectional moving vehicle of the present invention is not limited to these. Many modifications are possible without departing from the scope of the present invention. For example, the above embodiments employ motors as power sources and execute running and steering by controlling the numbers of rotations of these motors, but the method of controlling motors is not particularly limited.

The wheelchair A obtained by mounting the seat unit C and the transportation vehicle B obtained by mounting the container unit E on the vehicle body base 6 of the omnidirectional moving vehicle of the embodiment have been shown as examples. However, the drive mechanism of the present invention can be applied not only to these vehicles but also any vehicle which needs a change of direction or turning in a small space or mobile robots to be used for a variety of purposes.

REFERENCE SIGNS LIST 1 a steering unit
2 a drive member
3 an output shaft
4, 4a, 4b, 4c, 4d wheels
5 a wheel frame 6 a vehicle body base
7 output units
11a, 11b bearings
21a, 21b support shafts
22 a first drive unit
23 a second drive unit
24, 25 pulleys
31, 41 bevel gears
42 a horizontal shaft
43, 44, 45, 46 pulleys
47, 48 belts
51 a plate
52a, 52b support posts
71 a first output unit
72 a second output unit
73 a conversion unit
100, 200 omnidirectional moving vehicles
A a wheelchair
C a seat unit
D a transportation vehicle
E a container unit
Ma1 to Md2 motors
Xa to Xd drive mechanisms
$Z_A$ the number of teeth of the first drive unit
$Z_B$ the number of teeth of the second drive unit
$Z_{C1}$ the number of teeth of the first output unit
$Z_{C2}$ the number of teeth of the second output unit
$\omega_A$ the number of rotations of the first drive unit
$\omega_B$ the number of rotations of the second drive unit
$\omega_C$ the number of rotations of the output shaft
$\omega_D$ the number of rotations of the steering unit

The invention claimed is:

1. A steerable drive mechanism, comprising:
a rotatable steering unit;
a wheel supported by the steering unit;
a drive member rotating about an axis extending along a center axis of the steering unit; and
an output shaft located at a position eccentric from the center axis of the steering unit and transmitting rotational force obtained from the drive member to the wheel,
the drive member comprising a first drive unit driven in a forward rotation direction and a second drive unit driven in a reverse rotation direction and located coaxially with the first drive unit, and
the output shaft being provided with a first output unit to which driving force is transmitted from the first drive unit, and a second output unit to which driving force is transmitted from a conversion unit for converting the rotation direction of the second drive unit into a forward rotation direction, being restricted by the first and second output units, and transmitting rotational force obtained from the output units to the wheel.

2. The steerable drive mechanism according to claim 1, wherein the first and second drive units can individually obtain driving force from different power sources whose numbers of rotations are individually controlled.

3. The steerable drive mechanism according to claim 2, wherein when the numbers of rotations of the first and second drive units are equal to each other, the first and second output units rotate at the same number of rotations.

4. The steerable drive mechanism according to claim 1, wherein all of the first and second drive units, the conversion unit, and the first and second output units are spur gears.

5. The steerable drive mechanism according to claim 4, wherein a ratio of the number of teeth of the first drive unit to that of the first output unit is equal to a ratio of the number of teeth of the second drive unit to that of the conversion unit, and
the number of teeth of the conversion unit and that of the second output unit are equal to each other.

6. The steerable drive mechanism according to claim 5, wherein the wheel has a ground contact point at an offset position from the center axis of the steering unit, and
the amount of the offset is a length obtained by multiplying a ratio of the number of teeth of the first drive unit to that of the first output unit by a radius of the wheel.

7. The steerable drive mechanism according to claim 1, wherein the wheel has a ground contact point at an offset position from the center axis of the steering unit.

8. The steerable drive mechanism according to claim 1, wherein the output shaft has a bevel gear at a wheel side end thereof, and transmits rotational force to the wheel by way of a bevel gear in engagement with the bevel gear of the output shaft.

9. An omnidirectional moving vehicle having the steerable drive mechanism according to claim 1, comprising a vehicle body and a plurality of wheels,
at least two wheels of the plurality of wheels being equipped with the driving mechanism.

10. An omnidirectional moving vehicle having wheels equipped with the steerable drive mechanism according to claim 1, comprising:
a vehicle body;
four wheels;
pairs of motors each pair respectively providing driving force to the first and second drive units of each of the wheels;
rotation number detecting means for detecting the number of rotations of each of the motors;
angle detecting means for detecting steering angle of the steering unit;
control means for controlling the number of rotations of each of the motors; and
an operation unit for giving an instruction to the control means.

11. The omnidirectional moving vehicle according to claim 10, wherein the control means individually controls the four wheels upon the instruction from the operation unit.

12. The omnidirectional moving vehicle according to claim 10, wherein the vehicle body is a vehicle body of a wheelchair having a seat unit.

13. The omnidirectional moving vehicle according to claim 10, wherein the vehicle body is a vehicle body of a transportation vehicle having a container unit of a predetermined capacity.

* * * * *